(12) United States Patent
Droske et al.

(10) Patent No.: US 9,355,492 B2
(45) Date of Patent: May 31, 2016

(54) SYSTEM, METHOD, AND COMPUTER PROGRAM PRODUCT FOR UTILIZING A WAVEFRONT PATH TRACER

(71) Applicant: NVIDIA Corporation, Santa Clara, CA (US)

(72) Inventors: Marc Droske, Berlin (DE); Daniel Johannes Seibert, Berlin (DE); Stefan Radig, Brandenburg (DE); Alexander Keller, Berlin (DE); Julia Floetotto, Berlin (DE); Samuli Matias Laine, Vantaa (FI); Tero Tapani Karras, Helsinki (FI); Timo Oskari Aila, Tuusula (FI); Leonhard Gruenschloss, Pyrmont (AU)

(73) Assignee: NVIDIA Corporation, Santa Clara, CA (US)

( * ) Notice: Subject to any disclaimer, the term of this patent is extended or adjusted under 35 U.S.C. 154(b) by 205 days.

(21) Appl. No.: 14/098,468

(22) Filed: Dec. 5, 2013

(65) Prior Publication Data

US 2014/0340403 A1 Nov. 20, 2014

Related U.S. Application Data

(60) Provisional application No. 61/823,875, filed on May 15, 2013.

(51) Int. Cl.
*G06T 15/06* (2011.01)
(52) U.S. Cl.
CPC .................................. *G06T 15/06* (2013.01)
(58) Field of Classification Search
None
See application file for complete search history.

(56) References Cited

U.S. PATENT DOCUMENTS

| 7,012,604 B1 * | 3/2006 | Christie ................. G06T 15/06 345/426 |
| 2008/0012857 A1 * | 1/2008 | Sun ........................ G06T 15/50 345/426 |

OTHER PUBLICATIONS

Parker et al., "OptiX: A General Purpose Ray Tracing Engine," ACM Transactions on Graphics (TOG), Proceedings of ACM SIGGRAPH 2010, vol. 29, No. 4, Article No. 66, 2010, pp. 1-13.
Hanika, J. et al., "Two-Level Ray Tracing with Reordering for Highly Complex Scenes," Proceedings of Graphics Interface, 2010, pp. 145-152.
Aila, T. et al., "Understanding the Efficiency of Ray Traversal on GPUs," Proceedings of High Performance Graphics, 2009, pp. 145-149.
Aila, T. et al., "Understanding the Efficiency of Ray Traversal on GPUs—Kepler and Fermi Addendum," NVIDIA Technical Report NVR-2012-02, NVIDIA, 2012, pp. 1-4.
Stich, M. et al., "Spatial Splits in Bounding Volume Hierarchies," Proceedings of High Performance Graphics, 2009, pp. 7-13.
Veach, E. et al., "Optimally Combining Sampling Techniques for Monte Carlo Rendering," Proceedings ACM SIGGRAPH '95, 1995, pp. 419-428.
Pharr, M. et. al., "Physically Based Rendering: From Theory to Implementation," Morgan Kaufmann, Second Edition, 2010.

(Continued)

*Primary Examiner* — Said Broome
(74) *Attorney, Agent, or Firm* — Zilka-Kotab, PC

(57) ABSTRACT

A system, method, and computer program product are provided for utilizing a wavefront path tracer. In use, a set of light transport paths associated with a scene is identified. Additionally, parallel path tracing is performed, utilizing a wavefront path tracer.

28 Claims, 8 Drawing Sheets

(56) References Cited

OTHER PUBLICATIONS

"Mitsuba-physically based renderer," 2010, pp. 1-3, retrieved from http://www.mitsuba-render.org.

Ernst, M. et al., "Embree: Photo-Realistic Ray Tracing Kernels," White Paper, Intel, Jun. 2011, pp. 1-4.

Joe, S. et al., "Constructing Sobol Sequences With Better Two-Dimensional Projections," Siam Journal of Scientific Computing, vol. 30, No. 5, 2008, pp. 2635-2654.

van Antwerpen, D., "Improving SIMD Efficiency for Parallel Monte Carlo Light Transport on the GPU," Proceedings of High Performance Graphics, 2011, pp. 41-50.

Lafortune, E. et al., "Bi-Directional Path Tracing," Proceedings of Compugraphics '93, 1993, pp. 145-153.

Veach, E. et al., "Bidirectional Estimators for Light Transport," Proceedings of Eurographics Rendering Workshop, 1994, pp. 147-162.

Veach, E. et al., "Metropolis Light Transport," Proceedings of ACM SIGGRAPH '97, 1997, pp. 65-76.

Kelemen, C. et al., "A Simple and Robust Mutation Strategy for the Metropolis Light Transport Algorithm," Eurographics, vol. 21, No. 3, 2002, pp. 531-540.

Kniep, S. et al., "Efficient and Accurate Rendering of Complex Light Sources," Eurographics Symposium on Rendering, vol. 28, No. 4, 2009, pp. 1073-1081.

Raab, M. et al., "Unbiased Global Illumination with Participating Media," Monte Carlo and Quasi-Monte Carlo Methods, 2006, pp. 591-605.

Pharr, M. et al., "ispc: A SPMD Compiler for High-Performance CPU Programming," Proceedings of InPar 2012, 2012 pp. 1-13.

Kajiya, J.T., "The Rendering Equation," Proceedings of ACM SIGGRAPH 86, vol. 20, No. 4, 1986, pp. 143-150.

Pharr, M. et al., "Geometry Caching for Ray-Tracing Displacement Maps," Proceedings of the Eurographics Workshop on Rendering Techniques, 1996, pp. 1-10.

Budge, B. et al., "Out-of-core Data Management for Path Tracing on Hybrid Resources," Proceedings of Eurographics 2009, vol. 28, No. 2, 2009, pp. 1-12.

Pharr, M. et al., "Rendering Complex Scenes with Memory-Coherent Ray Tracing," Proceedings of SIGGRAPH 1997, 1997, pp. 1-8.

Navratil, P.A., et al., "Dynamic Ray Scheduling for Improved System Performance," The University of Texas at Austin, Technical Report TR-07-19, 2007, pp. 1-8.

Hoberock, J. et al., "Stream Compaction for Deferred Shading," Proceedings of High Performance Graphics, 2010, pp. 173-180.

Novak, J. et al., "Path Regeneration for Interactive Path Tracing," Eurographics 2010, 2010, pp. 1-4.

Robinson, A., "Scheduling in Optix: The NVIDIA ray tracing engine," High Performance Graphics, 2009, pp. 1-28, retrieved from http://www.highperformancegraphics.org/previous/www_2009/presentations/nvidia-rt.pdf.

Wald, I., "Active Thread Compaction for GPU Path Tracing," 2011, pp. 1-8.

\* cited by examiner

SYSTEM, METHOD, AND COMPUTER PROGRAM PRODUCT FOR UTILIZING A WAVEFRONT PATH TRACER

CLAIM OF PRIORITY

This application claims the benefit of U.S. Provisional Application No. 61/823,875, filed May 15, 2013, the entire contents of which are incorporated herein by reference.

FIELD OF THE INVENTION

The present invention relates to computer graphics, and more particularly to performing efficient parallel path tracing within a scene.

BACKGROUND

Applications are currently being developed for implementation on graphics processing units (GPUs) utilizing general purpose programming interfaces. For example, these interfaces may expose the execution units of the GPUs to a programmer and may allow memory accessing and parallel programming. However, current techniques for developing such applications have been associated with various limitations.

For example, certain characteristics of GPUs may differ significantly from central processing units (CPUs). As a result, naively ported CPU programs (e.g., path tracers, etc.) may often perform poorly on GPUs. There is thus a need for addressing these and/or other issues associated with the prior art.

Computer graphics applications may have to process data which exceeds the available memory of the computer. Often the memory constraints are tighter on the GPU than on the CPU. In many instances, some part of this data can be generated procedurally. Computer graphics programs, such as path tracers, may need to access this data in a random and incoherent way. Therefore, naïve implementations, which generate the data procedurally or load parts of the data from a storage device, may perform poorly if no coherency is enforced.

SUMMARY

A system, method, and computer program product are provided for utilizing a wavefront path tracer. In use, a set of light transport paths associated with a scene is identified. Additionally, parallel path tracing is performed, utilizing a wavefront path tracer.

DETAILED DESCRIPTION

Figure 1:
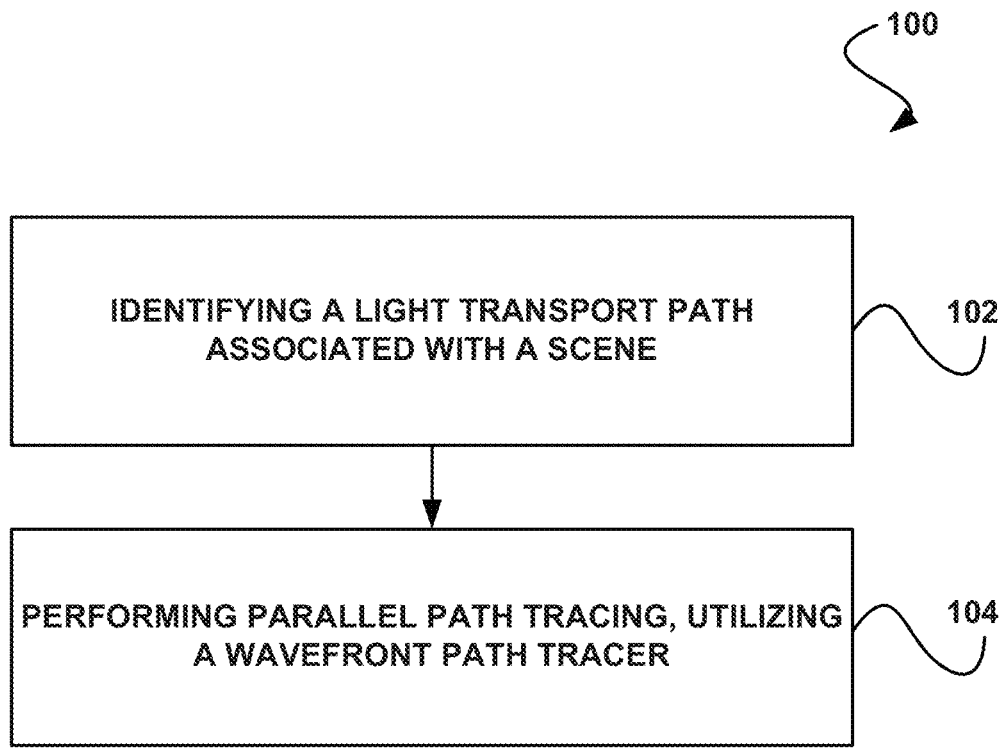
FIG. 1 shows a method for utilizing a wavefront path tracer, in accordance with one embodiment.

FIG. 1 shows a method 100 for utilizing a wavefront path tracer, in accordance with one embodiment. As shown in operation 102, a light transport path associated with a scene is identified. In one embodiment, the scene may include a multimedia scene. For example, the scene may include a multimedia scene that is to be rendered. In another embodiment, the light transport path may include a light transport path within the scene. For example, the light transport path may include a light transport path within a scene that is traced in order to generate images of the scene.

Additionally, in yet another embodiment, the light transport path may be identified from a plurality of light transport paths. For example, the light transport path may be one of a plurality of light transport paths that are stored within a pool. In another example, each of the plurality of light transport paths may be stored within a pool of light transport paths accessible by a wavefront path tracer.

Further, as shown in operation 104, parallel path tracing is performed, utilizing a wavefront path tracer. In one embodiment, the wavefront path tracer may include a path tracer that is decomposed into a plurality of stages. For example, the wavefront path tracer may include a path tracer that is decomposed into a three stage design. In another embodiment, each of the stages of the wavefront path tracer may include one or more kernels. For example, each stage of the wavefront path tracer may include one or more kernels that perform one or more actions, utilizing the light transport path.

In yet another embodiment, the one or more kernels may include one or more computer programs that manage input and/or output requests (e.g., from software, etc.). In still another embodiment, the one or more kernels may translate requests into data processing instructions (e.g., instructions for a graphics processing unit (GPU), etc.). In another embodiment, the wavefront path tracer may be associated with a processor. For example, the wavefront path tracer may be implemented for a graphics processing unit (GPU).

Further still, in one embodiment, the first stage of the wavefront path tracer may include a logic stage. In another embodiment, the logic stage of the wavefront path tracer may include a single kernel (e.g., a logic kernel, etc.). In yet another embodiment, performing the path tracing on the path may include advancing the path by one segment, utilizing the logic kernel. In still another embodiment, performing the path tracing on the path may include performing one or more additional operations, utilizing the logic kernel.

For example, performing the one or more additional operations utilizing the logic kernel may include calculating multiple importance sampling weights for one or more light and extension segments. In another example, performing the one or more additional operations utilizing the logic kernel may include updating a throughput of an extended path. In yet another example, performing the one or more additional operations utilizing the logic kernel may include accumulating a light sample contribution in a path radiance if a shadow ray is not blocked. In still another example, performing the one or more additional operations utilizing the logic kernel may include determining if the path should be terminated (e.g., due to an extension ray leaving the scene, a path throughput falling to zero, a determination in Russian roulette, etc.).

In another example, performing the one or more additional operations utilizing the logic kernel may include accumulating a pixel value for a terminated path. In yet another example, performing the one or more additional operations utilizing the logic kernel may include producing a light sample for a path segment. In still another example, performing the one or more additional operations utilizing the logic kernel may include determining a material at an extension ray hit point. In another example, performing the one or more additional operations utilizing the logic kernel may include placing a material evaluation request for the material stage.

Also, in one embodiment, the second stage of the wavefront path tracer may include a material stage. In another embodiment, the material stage of the wavefront path tracer may include a plurality of kernels. For example, the material stage may include a new path kernel as well as one or more material kernels. In yet another embodiment, each of the kernels in the material stage may include a queue. For example, each queue may receive requests from the logic stage for the kernel associated with the queue.

Additionally, in one embodiment, performing the path tracing on the path may include performing one or more additional operations, utilizing the new path kernel. For example, the logic kernel may determine that the path is terminated and may place a request into the queue of the new path kernel. In another example, in response to receiving the request from the queue, the new path kernel may initialize a path state and generate a camera ray. In yet another example, the new path kernel may place the generated camera ray into another queue (e.g., a queue associated with an extension ray cast kernel, etc.).

Further, in one embodiment, performing the path tracing on the path may include performing one or more additional operations, utilizing the one or more material kernels. For example, if it is not determined that the path should be terminated in the logic stage, a material kernel queue may receive data from the logic stage, where the data may include one or more of a surface point, an outgoing direction (e.g., towards the camera, etc.), and a light sample direction. In another embodiment, the one or more additional operations may be performed by the material kernel, utilizing the data received in the queue of the material kernel.

For example, performing the one or more additional operations utilizing the material kernel may include producing a plurality of outputs, where the outputs include one or more of an importance sampled incoming direction, a value of an importance sampling probability distribution function, and a throughput between incoming and outgoing directions. In another example, the outputs may include one or more of a throughput between a light sample direction and an outgoing direction, a probability of producing a light sample direction when sampling an incoming direction (e.g., for multiple importance sampling, etc.), and a medium identifier in the incoming direction.

Further still, in one embodiment, each of the one or more material kernels may be associated with a material (e.g., material code composed of multiple bidirectional scattering distribution function (BSDF) layers, etc.). For example, each of the one or more material kernels may have a material present in the scene assigned to it. In another embodiment, materials determined to be expensive (e.g., from a computational perspective, etc.) may each be assigned to an individual material kernel, and materials determined to be simple may be combined, with the combination being assigned to a single material kernel.

Also, in one embodiment, one or more ray cast requests may be generated at the material stage. For example, a new path kernel may generate an extension ray but not a shadow ray. In another example, one or more of the material kernels may each generate both an extension ray and a shadow ray. In another embodiment, the one or more ray cast requests may be placed in one or more queues in the ray case stage.

In addition, in one embodiment, the third stage of the wavefront path tracer may include a ray cast stage. In another embodiment, the ray cast stage of the wavefront path tracer may include a plurality of kernels. For example, the ray cast stage may include an extension ray cast kernel as well as a shadow ray cast kernel. In yet another embodiment, each of the kernels in the ray cast stage may include a queue. For example, each queue may receive requests from the material stage for the kernel associated with the queue.

Furthermore, in one embodiment, performing the path tracing on the path may include performing one or more additional operations, utilizing the extension ray cast kernel. For example, the new path kernel or a material kernel may place an extension ray request into the queue of the extension ray cast kernel. In another example, in response to receiving the request from the queue, the extension ray cast kernel may cast an extension ray. For example, the extension ray cast kernel may place a ray cast result into a result buffer.

Further still, in one embodiment, performing the path tracing on the path may include performing one or more additional operations, utilizing the shadow ray cast kernel. For example, a material kernel may place a shadow ray request into the queue of the shadow ray cast kernel. In another example, in response to receiving the request from the queue, the shadow ray cast kernel may cast a shadow ray. For example, the shadow ray cast kernel may place a ray cast result into a result buffer.

Also, in one embodiment, the wavefront path tracer may utilize a structure of arrays (SOA) memory layout. In another embodiment, the queues of each kernel in the material stage and ray cast stage may include a preallocated global memory buffer that may have a size able to contain indices of every path in the pool of paths.

In this way, path tracing may be performed, utilizing a wavefront path tracer decomposed into a logic stage, a material stage, and a ray cast stage. This wavefront path tracer may keep a large pool of paths alive at all times, which may allow executing ray casts and material evaluations in coherent chunks over large sets of rays. This may reduce control flow divergence, improve single instruction multiple thread (SIMD) thread utilization, and prevent resource usage hot spots from dominating the latency-hiding capability of the program.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
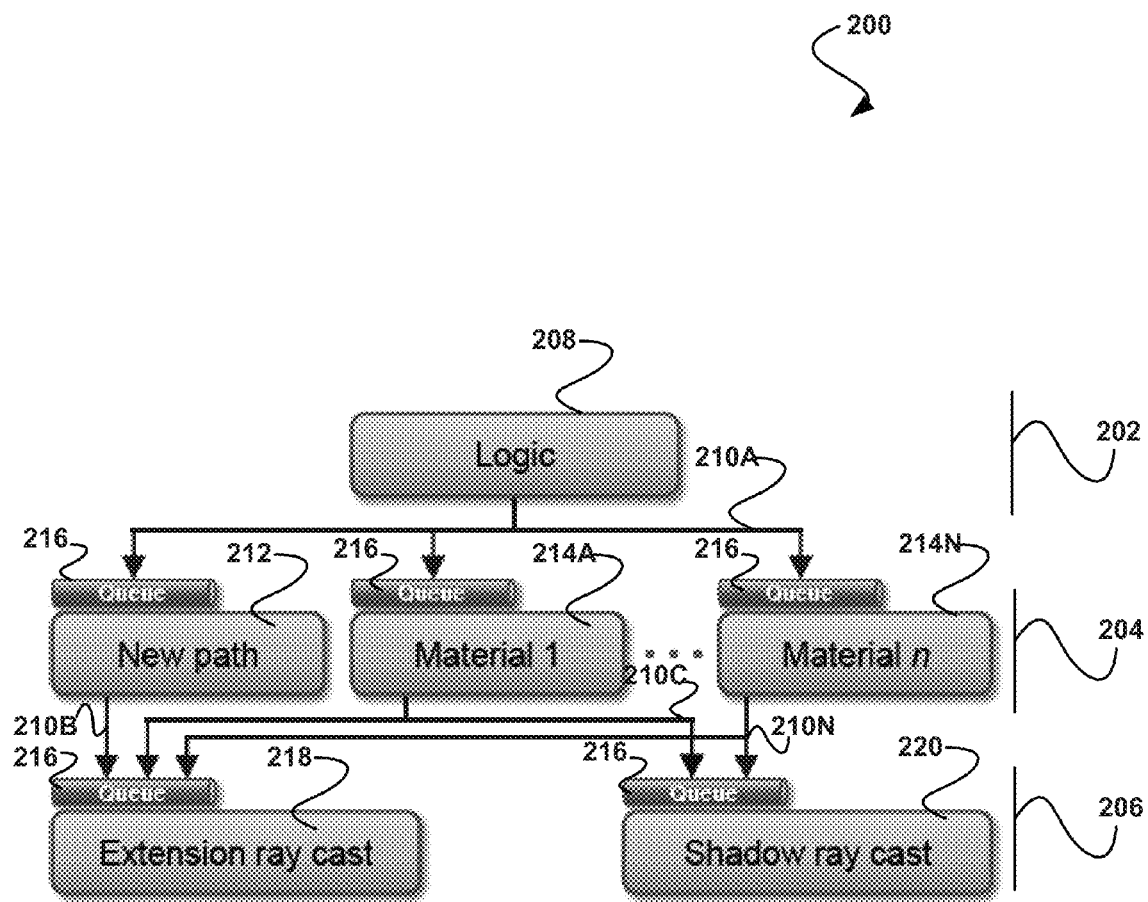
FIG. 2 shows an exemplary wavefront path tracer design, in accordance with another embodiment.

FIG. 2 shows an exemplary wavefront path tracer design 200, in accordance with another embodiment. As an option, the design 200 may be carried out in the context of the functionality of FIG. 1. Of course, however, the design 200 may be implemented in any desired environment. It should also be noted that the aforementioned definitions may apply during the present description.

As shown, the exemplary wavefront path tracer design 200 includes a logic stage 202, a material stage 204, and a ray cast stage 206. Additionally, the logic stage 202 communicates with the material stage 204 via queue writes 210A, and the material stage communicates with the ray cast stage via queue writes 210B-N. Further, each kernel in the material stage 204 and the ray cast stage 206 has its own queue 216. In one embodiment, communication between stages may be carried out through the path state which may be stored in global memory, and the queues 216 that may also be located in global memory. Each kernel that is not executed for all paths in the pool has an associated queue 216 that may be filled with requests by the preceding stage. The logic kernel 208, comprising the first stage, may not require a queue because it may always operate on all paths in the pool. The queues 216 may be of fixed maximum size and they may be preallocated in GPU memory. For example, the memory consumption of each queue 216 may be 4 MB.

In one embodiment, the wavefront path tracer design 200 may be based on keeping a pool of 1 M ($=2^{20}$) paths alive at all times. On each iteration, every path may be advanced by one segment, and if a path is terminated, it may be regenerated during the same iteration. Path state may be stored in global memory on a GPU board (DRAM), and may consume 212 bytes per path, including extension and shadow rays and space for the results of ray casts. In another embodiment, the total path state therefore may consume 212 MB of memory. In yet another embodiment, if higher memory usage is allowed, a slight performance increase may be obtained by enlarging the pool size (~5% when going from 1 M to 8 M paths consuming 1.7 GB).

Further, the logic stage 202 includes a single logic kernel 208. In one embodiment, the task of the logic kernel 208 may be is to advance the path by one segment. Material evaluations and ray casts related to the previous segment may have been performed during the previous iteration by the subsequent stages. In one embodiment, the logic kernel 208 may perform all tasks required for path tracing besides the material evaluations and ray casts. These may include one or more of calculating multiple importance sampling weights for light and extension segments, updating throughput of extended path, accumulating light sample contribution in the path radiance if the shadow ray was not blocked, determining if path should be terminated, due to extension ray leaving the scene, path throughput falling to zero, or Russian roulette, for a terminated path, accumulating pixel value, producing a light sample for the next path segment, determining material at extension ray hit point, and placing a material evaluation request for the following stage.

Further still, in one embodiment, the generation of a new path may be treated in the same fashion as evaluating a material. This may be a natural place for this operation, because as for materials, an extension ray (e.g., the camera ray, etc.) may be cast right afterwards, and no other path tracing logic may be performed before the ray cast has been completed.

Also, the material stage 204 may include a new path kernel 212 and a plurality of material kernels 214A-N. In one embodiment, after the logic stage 202, each path in the pool may be either terminated or the material may need to be evaluated at an extension ray hit point. For terminated paths, the logic kernel 208 may place a request into the queue 216 of the new path kernel 212 that may initialize path state and generate a camera ray. This camera ray may be placed into the extension ray cast 218 queue 216 by the new path kernel 212. Non-terminated paths may be handled by one or more material kernels 214A-N.

Additionally, in one embodiment, one or more of the material kernels 214A-N may produce one or more of the following outputs when given a surface point, an outgoing direction (e.g., towards the camera), and a light sample direction: an importance sampled incoming direction, a value of the importance sampling probability density function, a throughput between incoming and outgoing directions, a throughput between light sample direction and outgoing direction, a probability of producing the light sample direction when sampling incoming direction (e.g., for multiple importance sampling, etc.), and a medium identifier in the incoming direction.

Further, in one embodiment, each material present in the scene may be assigned to one of the material kernels 214A-N. In one embodiment, each material determined to be "expensive" may be placed into its own material kernel 214A-N, and all materials determined to be "simple" may be combined into one material kernel 214A-N. This may be done by hand or by automated assignment, e.g., based on the amount of code in the individual material evaluators.

Further still, in one embodiment, the kernels in the material stage 204 may place ray cast requests for the following ray cast stage 206. The new path kernel 212 may always generate an extension ray but may not generate a shadow ray. In another embodiment, material kernels 214A-N may generate both an extension ray and a shadow ray, but some material kernels 214A-N such as mirrors and dielectrics may choose not to generate the shadow ray. In another embodiment, if extension ray generation fails (e.g., glossy reflection direction falling below horizon), an extension ray may not be generated and the path may be flagged for termination by setting its throughput to zero.

Also, the ray cast stage 206 may include an extension ray cast kernel 218 and a shadow ray cast kernel 220 that collect extension and shadow rays, respectively. See, for example, "Understanding the efficiency of ray traversal on GPUs" (Aila et al., In Proc. High Performance Graphics, 145-149, 2009), and "Understanding the efficiency of ray traversal on GPUs—Kepler and Fermi addendum" (Aila et al., Tech. Rep. NVR-2012-02, NVIDIA, 2012), which are hereby incorporated by reference in their entirety, and which describe exemplary ray casting. In one embodiment, the kernels may place results into result buffers at indices corresponding to the requests in the input buffers. In another embodiment, the path state may record the indices in the ray buffers in order to enable fetching the results in the logic stage 202.

In this way, computation may be divided into three stages: a logic stage 202, a material stage 204, and a ray cast stage 206. In one embodiment, light sampling and evaluation may not be split into separate stages. In another embodiment, light sampling and evaluation may be split into separate stages. In yet another embodiment, the acceleration hierarchies may be built using a single bounding volume hierarchy (SBVH) algorithm. See, for example, "Spatial splits in bounding volume hierarchies" (Stich et al., In Proc. High Performance Graphics, 7-13, 2009), which is hereby incorporated by reference in its entirety.

Additionally, in one embodiment, path state may be kept in memory instead of local registers. The majority of the path state may be accessed in the logic kernel 208 that may always operate on all paths. Therefore, the threads in a warp in the logic kernel 208 may operate on paths with consecutive indices in the pool. In another embodiment, by employing a structure-of-arrays (SOA) memory layout, each access to a path state variable in the logic kernel may result in a contiguous read/write of 32 32-bit memory words, aligned to a 1024-bit boundary. The GPU memory architecture may be extremely efficient for these kinds of memory accesses. In the other kernels, the threads may not necessarily operate on consecutive paths, but memory locality may still be greatly improved by the SOA layout.

Further, in one embodiment, by producing compact queues of requests for the material and ray cast stages, it may be ensured that each launched kernel always has useful work to perform on all threads of a warp. The queues 216 may be simple preallocated global memory buffers sized so that they can contain indices of every path in the pool. Each queue 216 may have an item counter in global memory that may be increased atomically when writing to the queue 216. Clearing a queue 216 may be achieved by setting the item counter to zero.

At queue writes, it may be possible for each thread in a warp to individually perform the atomic increment and the memory write. In another embodiment, the atomic operations may be coalesced programmatically within each warp prior to performing the atomic operations. This may be done using warp-wide ballot operations where each thread sets a bit in a mask based on a predicate, and this mask is communicated to every thread in the warp in one cycle.

Further still, in one embodiment, the materials commonly used in production rendering may be composed of multiple bidirectional scattering distribution function (BSDF) layers. The purpose of the material code, generated by the artist either programmatically or through tools, may be to output a stack of BSDFs when given a surface point. The possible BSDFs may be supplied by the underlying renderer, and typically cannot be directly modified. This may ensure that the renderer is able to evaluate extension directions, light connection weights, sampling probabilities, etc., as required by the light transport algorithm used. In another embodiment, common operations in the material code include texture coordinate calculations, texture evaluations, procedural noise evaluations, or even ray marching in a mesostructure.

Also, in one embodiment, the aforementioned methods may be applied to the evaluation of procedural noise functions for flake layers. For example, two noise evaluations may be required per layer: the first noise may perturb the given surface position slightly, and this perturbed position is then quantized and used as an input to the second noise evaluation to obtain flake weight and normal. To produce two flake layers, four noise evaluations may therefore be required in total. It should be noted that four noise evaluations may be a relatively modest number compared to multi-octave gradient noise required in, e.g., procedural stone materials. Also, further layers for dirt, decals, etc. may be added on top of a scene, each with their own BSDFs. As such, material evaluations may be very expensive compared to other work done during rendering, and hence executing them efficiently may be highly important.

Additionally, in one embodiment, using a path tracer, light sources may be either directly sampled (e.g., area lights or distant angular light sources like the sun), or not (e.g., "bland" environment maps, extremely large area lights), as specified in the scene data. A light sample may be generated out of the directly sampled light sources, and a shadow ray may be cast between the path vertex and light sample. Multiple importance sampling (MIS) with the power heuristic may be used for calculating the weights of the extended path and the explicit light connection, which may require knowing the probability density of the light sampler at the extension ray direction, and vice versa, in addition to the usual sampling probabilities. See, for example, "Optimally combining sampling techniques for Monte Carlo rendering" (Veach et al., In Proc. ACM SIGGRAPH 95, 419-428, 1995), which is hereby incorporated by reference in its entirety. Also, see, for example, "Physically Based Rendering" (Pharr et al., 2nd ed. Morgan Kaufmann, 2010), "Mitsuba renderer" (Jakob, http://www.mitsubarenderer.org, 2010), and "Embree: Photo-realistic ray tracing kernels" (Ernst et al., White paper, Intel, 2011), which are hereby incorporated by reference in their entirety, and which disclose various path tracer implementations.

Further, in one embodiment, Russian roulette may be employed for avoiding arbitrarily long paths. For example, the roulette may start after eight path segments, and the continuation probability may be set to path throughput clamped to 0.95. For generating low-discrepancy quasirandom numbers needed in the samplers, Sobol sequences may be used for the first 32 dimensions, and after that revert to purely random numbers generated by hashing together pixel index, path index, and dimension. See, for example, "Constructing Sobol sequences with better two-dimensional projections" (Joe et al., SIAM J. Sci. Comput. 30, 2635-2654, 2008), which is hereby incorporated by reference in its entirety.

Also, in one embodiment the Sobol sequences for the first 32 dimensions may be precomputed on the CPU and shared between all pixels in the image. In addition, each pixel may have an individual randomly generated scramble mask for each Sobol dimension that is XORed together with the Sobol sequence value, which may ensure that each pixel's paths are well distributed in the path space but uncorrelated with other pixels. Generating a quasirandom number on the GPU therefore may involve only two array lookups, one from the Sobol sequence buffer and one from the scramble value buffer, and XORing these together. Because the Sobol sequences may be shared between pixels, the CPU may only have to evaluate a new index in each of the 32 Sobol dimensions between every N paths, where N is the number of pixels in the image.

Further still, in one embodiment, augmenting more complex rendering algorithms such as bi-directional path tracing and Metropolis light transport with a multikernel material evaluation stage may be performed. See, for example, "Improving SIMD efficiency for parallel Monte Carlo light transport on the GPU" (VAN ANTWERPEN, D., In Proc. High Performance Graphics, 41-50, 2011), "Bi-directional path tracing" (LAFORTUNE, E. P., AND WILLEMS, Y. D., In Proc. Compugraphics, 145-153, 1993), "Bidirectional estimators for light transport" (Veach et al., In Proc. Eurographics Rendering Workshop, 147-162., 1994), "Metropolis light transport" (Veach et al., In Proc. ACM SIGGRAPH 97, 65-76, 1997), and "A simple and robust mutation strategy for the Metropolis light transport algorithm" (Kelemen et al., Comput. Graph. Forum 21, 3, 531-540, 2002), which are hereby incorporated by reference in their entirety. In another embodiment, in some predictive rendering tasks, the light sources may also be very complex, and a similar splitting into separate evaluation kernels may be warranted. See, for example, "Efficient and accurate rendering of complex light sources" (Kniep et al., Comput. Graph. Forum 28, 4, 1073-1081, 2009), which is hereby incorporated by reference in its entirety. In yet another embodiment, Monte Carlo rendering of participating media may be another case where the execution, consisting of short steps in a possibly separate data structure, may differs considerably from the rest of the computation, which may suggest that a specialized volume marching kernel would be advantageous. See, for example, "Unbiased global illumination with participating media"

(Raab et al., In Monte Carlo and Quasi-Monte Carlo Methods 2006. 591-605, 2008), which is hereby incorporated by reference in its entirety.

Also, in one embodiment, in the case of path tracing, finding a natural decomposition may based on the easily identifiable pain points that clash with the GPU execution model, and this general approach may be equally applicable to other application domains as well. Similar issues with control flow divergence and variable execution characteristics may be found in any larger-scale program.

In another embodiment, programming CPUs as SIMT machines has recently gained traction, partially thanks to the release of Intel's ispc compiler that allows easy parallelization of scalar code over multiple SIMD lanes. See, for example, "ispc: A SPMD compiler for high-performance CPU programming" (Pharr et al., In Proc. InPar 2012, 1-13, 2012), which is hereby incorporated by reference in its entirety. CPU programs written this way may suffer from control flow divergence just like GPU programs do, and may benefit from using the above techniques for improving the execution coherence.

General-purpose programming on GPUs is nowadays enabled by programming interfaces such as CUDA and OpenCL. These interfaces expose the GPU's execution units to the programmer and allow, e.g., general read/write memory accesses that were severely restricted or missing altogether from the preceding, graphics-specific shading languages. In addition, constructs that assist in parallel programming, such as atomic operations and synchronization points, are available.

The main difference between CPU and GPU programming is the number of threads required for efficient execution. On CPUs that are optimized for low-latency execution, only a handful of simultaneously executing threads are needed for fully utilizing the machine, whereas on GPUs the required number of threads runs in thousands or tens of thousands. Fortunately, in many graphics related tasks the work may be split into a vast number of independent threads. For example, in path tracing one may process a very large number of paths, and assigning one thread for each path may provides adequate parallelism. See, for example, "The rendering equation" (Kajiya, In Proc. ACM SIGGRAPH 86, 143-150, 1986), which is hereby incorporated by reference in its entirety.

However, even when parallelism is abundant, the execution characteristics of GPUs may differ considerably from CPUs. There are two main factors. The first is the SIMT (Single Instruction Multiple Threads) execution model, where many threads (typically 32) are grouped together in warps to always run the same instruction. In order to handle irregular control flow, some threads may be masked out when executing a branch they should not participate in. This may incur a performance loss, as masked-out threads are not performing useful work.

The second factor is the high-bandwidth, high-latency memory system. The impressive memory bandwidth in modern GPUs may come at the expense of a relatively long delay between making a memory request and getting the result. To hide this latency, GPUs are designed to accommodate many more threads than can be executed in any given clock cycle, so that whenever a group of threads is waiting for a memory request to be served, other threads may be executed. The effectiveness of this mechanism, i.e., the latency-hiding capability, may be determined by the threads' resource usage, for example, the number of registers used. Because the register files are of limited size, the more registers a kernel uses, the fewer threads can reside in the GPU, and consequently, the more limited the latency-hiding capabilities are.

On a CPU, neither of these two factors is a concern, which is why a naively ported large CPU program is almost certain to perform poorly on a GPU. Firstly, the control flow divergence that does not harm a scalar CPU thread may cause threads to be severely underutilized when the program is run on a GPU. Secondly, even a single hot spot that uses many registers will drive the resource usage of the entire kernel up, reducing the latency-hiding capabilities. Additionally, the instruction caches on a GPU are much smaller than those on a CPU, and large kernels may easily overrun them. For these reasons, a programmer may be wary of the traditional megakernel formulation, where all program code is added into one big GPU kernel.

However, the aforementioned figures discuss an implementation of a path tracer on a GPU in a way that avoids the above pitfalls. Our particular application includes complex, real-world materials that are used in production rendering. These may be almost arbitrarily expensive to evaluate, as the complexity may depend on material models constructed by artists who prefer to optimize for visual fidelity instead of rendering performance.

As shown hereinabove, a wavefront path tracer may keep a large pool of paths alive at all times, which may allow executing the ray casts and the material evaluations in coherent chunks over large sets of rays by splitting the path tracer into multiple specialized kernels. This may reduce the control flow divergence, thereby improving SIMT thread utilization, and may also prevent resource usage hot spots from dominating the latency-hiding capability for the whole program. In particular, using the above implementations, ray casts that consume a major portion of execution time may be executed using highly optimized, lean kernels that require few registers, without being polluted by high register usage in, e.g., material evaluators.

Pre-sorting work in order to improve execution coherence may be an optimization for traditional feed-forward rendering, where the input geometry may be easily partitioned according to, e.g., the fragment shader program used by each triangle. This may let each shader execute over a large batch of fragments, which may be more efficient than changing the shader frequently. In path tracing the situation may be more complicated, because it cannot be known in advance which materials the path segments will hit. Similarly, before the material code has been executed it may be unclear whether the path should be continued or terminated. Therefore, the sorting of work may happen on demand, and this may be achieved through queues that track which paths should be processed by each kernel.

Figure 3:
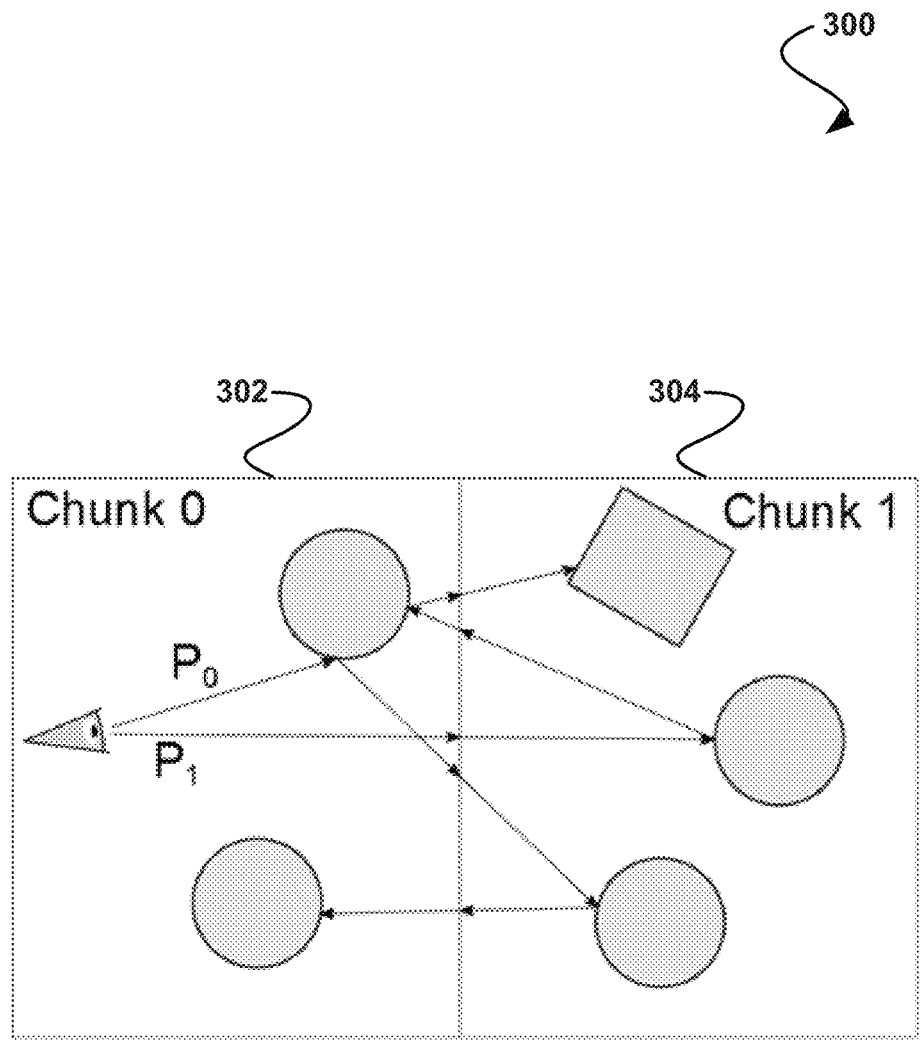
FIG. 3 shows an exemplary division of scene data into a spatial partition of separate chunks, in accordance with another embodiment.

More illustrative information will now be set forth regarding exemplary ray casting kernels. FIG. 3 shows an exemplary division of scene data 300 into a spatial partition of separate chunks 302 and 304, in accordance with another embodiment. As an option, the division of scene data 300 may be carried out in the context of the functionality of FIGS. 1 and/or 2. Of course, however, the division of scene data 300 may be implemented in any desired environment. It should also be noted that the aforementioned definitions may apply during the present description.

As shown, the scene data 300 may be divided in a further embodiment of the wave front path tracer into spatial partition of separate chunks 302 and 304, such that each chunk is small enough to reside in remaining available memory. For example, the chunk data may consist of geometry and other data (e.g., textures and other inputs needed for evaluating materials consisting of multiple layers of bidirectional scattering distribution functions, light emission profiles, and volumetric scattering coefficients).

The data represented by each of the chunks 302 and 304 may be represented in compact but sufficiently detailed form, to retrieve all the above mentioned required data in its entirety, for example by compression or a coarse description, which may allow the generation of the required data procedurally, each time the data needs to be fully restored. This may involve representing elements of the data in the chunk by coefficients of multiresolution surfaces, free form surfaces, and subdivision surfaces, including boundary and crease rules, as well as trimming. Furthermore, this may involve executing a kernel to generate a detailed geometric tessellation into polygons by applying displacement mapping onto a base surfaces such as a polygonal mesh, a multiresolution, free form, or a subdivision surface. See for example "Geometry caching for ray-tracing displacement maps" (Pharr and Hanrahan, Proceedings of the Eurographics workshop on Rendering techniques 1996) which is hereby incorporated by reference in its entirety.

The chunk data layout can be optimized to minimize the latency of retrieving the entirety of data from an external database or storage device, by storing contiguous blocks of data and avoiding data fragmentation. For example, it can be ensured that all geometry elements and texture data are stored contiguously in the same database element or data file.

In one embodiment the chunks may be created by maintaining a uniformly discretized three dimensional function, for example a grid of 1024×1024×1024 values, which maps uniform sub volumes of the scene, called bins, to a conservative memory usage estimate. The value in the bins can be accumulated by a linear traversal of the entire scene. Once the bins are filled, a spatial partition can be created over the grid of bins using a surface area heuristic, where the cost of a subset of the scene may correspond to the sum of all bins in such a subset.

Each element of the partition may incorporate a spatial acceleration structure, such as a bounding volume hierarchy, on the unfolded description for efficient computation of the intersection of a ray and the geometry data contained in the chunk. This acceleration structure may be contained on external storage such as a hard disk drive, or other secondary data storage. Alternatively, the acceleration structure can be generated on demand each time the chunk data is loaded into resident memory.

A specialized data structure to accelerate queries to determine which chunk is entered by a ray, which may leave another chunk or enter the scene from outside the entirety of all chunks, may be incorporated. This data structure may be in the form of a spatial partitioning tree or a bounding volume hierarchy on the whole set of chunks. This data structure may represent a higher level data structure, comprising all the elements of the partition which by itself may contain separate acceleration data structures as described above.

The retrieval of the relevant scene data associated with each chunk, which is required to execute the material and ray tracing kernels, may introduce additional latencies to the system whenever the chunk data is not resident in the memory accessible by the CPU or GPU which execute these kernels respectively. Due to the distributions in which extension rays or visibility rays are generated, such chunk accesses may be very incoherent in a naïve implementation.

Figure 4:
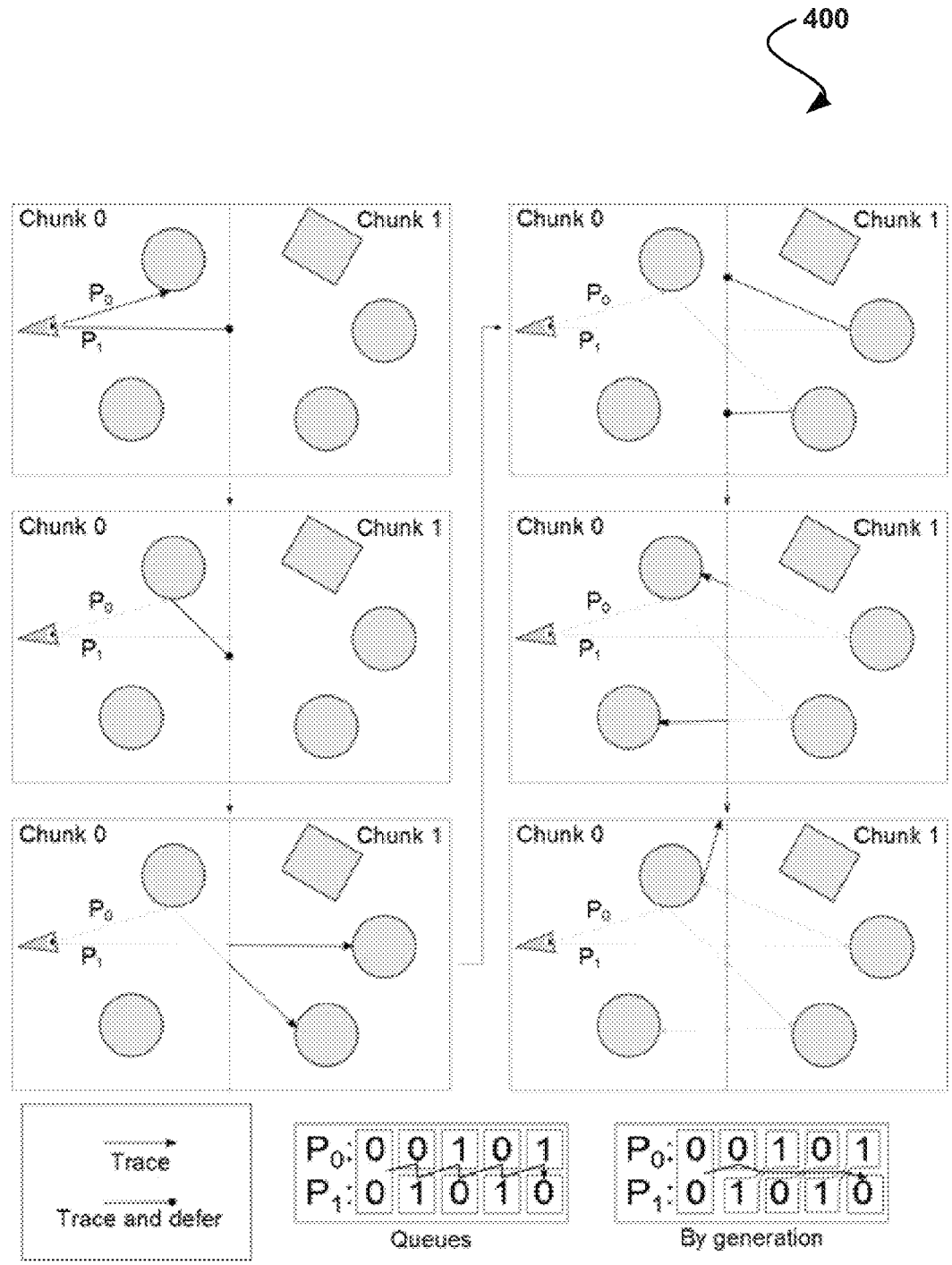
FIG. 4 shows an example of the use of chunk queues, in accordance with another embodiment.
Figure 5:
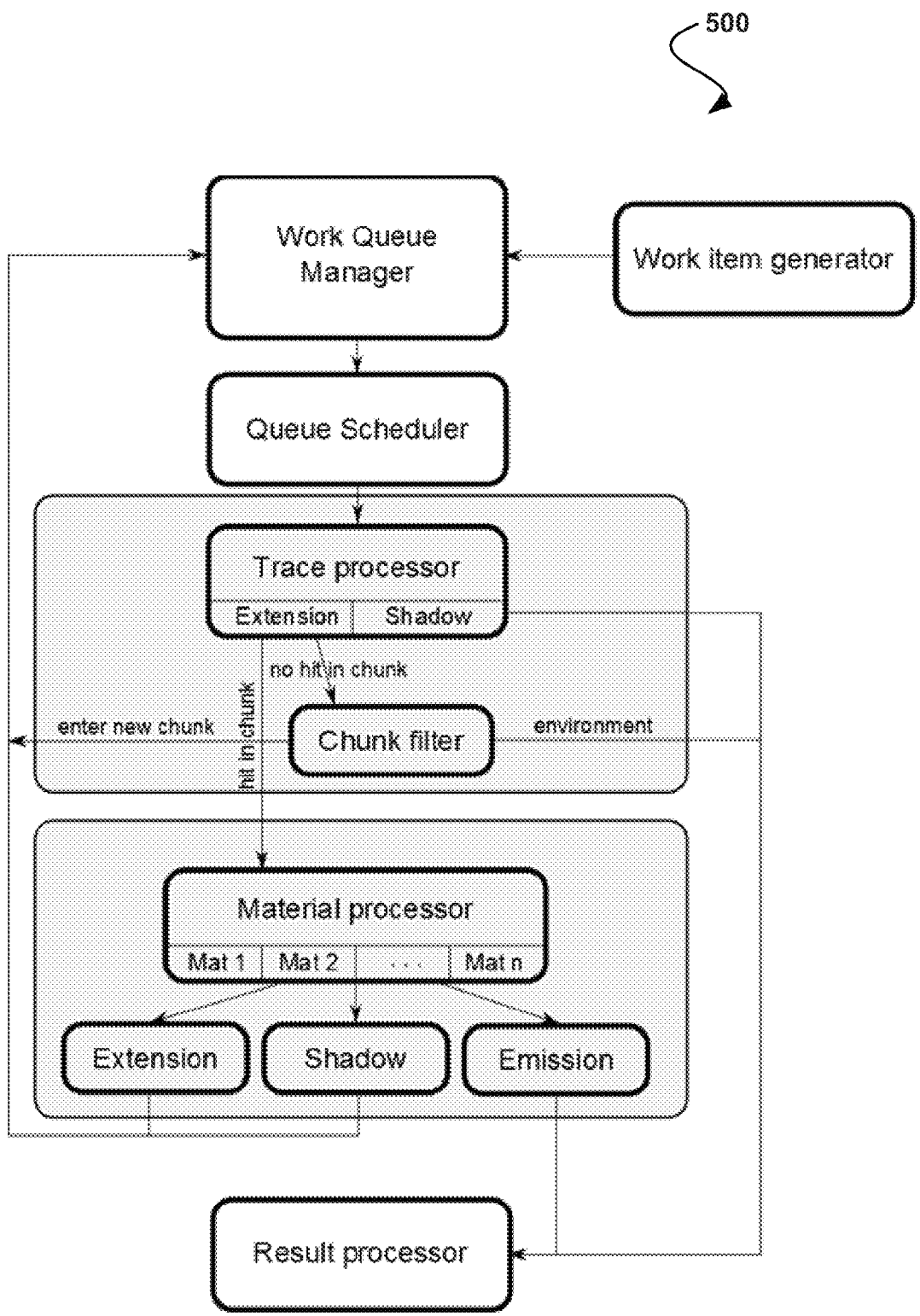
FIG. 5 shows another example of the use of chunk queues, in accordance with another embodiment.

To minimize the costs with respect to loading or generating chunk data, each chunk may be associated with a queue, which holds the current set of work items, usually consisting of rays generated by the wave front path tracer. An example of the use of chunk queues is shown in FIGS. 4 and 5. In one embodiment, whenever a queue is processed by the wave path tracer operating on the data within the chunk by executing the material, logic, and trace kernels, rays may leave the domain of the chunk. At this point, the processing of the ray may be deferred. The deferral consists of passing the work to the chunk filter which executes a query to the higher level acceleration structure to determine the next chunk that it may enter, in which case the ray is marked to be entered to this chunk or it may be marked to leave the entirety of chunks in which case the item is scheduled for termination, by evaluating the emission of the surrounding environment, potentially computing a multiple importance sampling weight, and accumulating the output to the image. The output of processing the kernels associated to a chunk thus consists of an output queue in which each item is associated with either a chunk or the exterior of the scene.

The entirety of queues corresponding to all chunks of the higher level partition may be stored in the work queue manager, which processes the output queue from each chunk and filters the items to the individual queues associated with each chunk. The work queue manager allows processing of these input queues in parallel and applies locking of the queues of the chunk whenever items are appended. This may involve presorting of the input queue to partition the queue with respect to the output chunk, such that the elements of corresponding to each chunk can be appended consecutively and thus requiring the acquisition of the lock associated to the queue only once. The sorting step may be implemented with a fast counting sort of complexity O(n).

The queue manager may provide information about the distribution of work contained in the queues, which can be queried in parallel. This may involve iteratively acquiring the locks of all queues and determining their size or it may alternatively involve keeping a lightweight histogram structure which represents the size of the queues for each chunk, protected by a separate lock, to avoid lock contention.

The queue scheduler is responsible for passing new work consisting of a queue of work items to the next processing unit, as soon as a prior execution of work has been terminated on that unit. The queue scheduler is evaluates a benefit-cost ratio associated to processing a queue contained in the queue manager and selects a queue with the highest of such ratios. Once this decision has been taken, the queue is removed from the queue manager, upon which the histogram structure is updated and the queue passed to the available processing unit.

The benefit-cost ratio may be influenced by the cost of retrieving the full data representation of the chunk including but not limited to loading intermediate or full representations from external storage, the cost of decompressing a compressed representation and procedural generation of data, including evaluation of geometric tessellation kernels and displacement. Furthermore, the cost of generating the acceleration data structure can be taken into account as well as memory latencies. In particular, the representation of the chunk may be available in a cache memory with low latency, which results in a particularly low cost.

In addition the cost of processing a queue of rays may be taken into account, which can be a highly nonlinear cost with respect to the number of rays, for example when on demand tessellation is employed. See, for example, on demand tessellation according to "Two-Level ray Tracing with Reordering for Highly Complex Scenes" (Hanika et al., Proceedings of Graphics Interface 2010, p. 145-152), which is hereby incorporated by reference in its entirety, and which discloses reordering the rays according to the bounding box of the higher level primitives they contain. These primitives are then tessellated and tested for an intersection after dicing into smaller primitives, potentially including displacement, and building a fast local acceleration structure in bottom-up manner.

In order to benefit from the computational power of SIMT-architectures as for example GPUs, an implementation of on demand tessellation and displacement needs to consider memory layout and allocation. Storing diced and displaced geometry and acceleration hierarchy across separate kernels for dicing, hierarchy construction and ray intersection, for huge scenes would dramatically limit the number of patches that can be efficiently handled. Therefore a memory block is allocated that is sufficiently large to store the tessellation data and an acceleration hierarchy for all active processing elements. Thus in NVIDIA's CUDA the memory footprint may be proportional to the number of active streaming multiprocessors (SMs). The constant of proportionality may be chosen just sufficiently large to enable latency hiding while still maximizing occupancy. Implemented as a persistent loop, the method's memory requirements become independent of the number of patches, which may be huge.

Table 1 illustrates exemplary pseudo-code of such a kernel, in accordance with one embodiment. Of course, it should be noted that the pseudo-code shown in Table 1 is set forth for illustrative purposes only, and thus should not be construed as limiting in any manner.

TABLE 1

```
while (true) {
    if (tid == 0) { // check thread id
        int cur_patch_idx = atomicAdd( g_patch_idx, 1
    ); // fetch patch block
        . . . // initialize patch data in shared memory
    etc.
    }
    Abort if cur_patch_idx >= num_patches.
    _syncthreads ( );
    1. Read control point data in shared mem
    _syncthreads ( );
    2. Dice
    _syncthreads ( );
    3. Build BVH
    _syncthreads ( );
    4. Intersect closest hit rays
    5. Shadow ray tests
}
```

In each of the 5 steps the compute threads may be assigned as needed: For example, in step 2 each thread may be determining one vertex of a polygonal mesh, in step 3 each thread may be assigned to determine the bounding volume of its children to build a bounding volume hierarchy (BVH) in a bottom up fashion, while in steps 4 and 5 each thread is assigned to process one ray. This way less memory is required and all patch-ray intersections can be processed in parallel at high occupancy using only one kernel.

Note that step 4 requires fine-grained locking of writing back the resulting intersection distances in order to deal with the fact that one ray can have multiple patches to intersect. Steps 5 may be implemented using at least one of an unordered traversal or a skip list implementation of the bounding volume hierarchy, while step 4 may use an ordered traversal for reasons of efficiency.

On the GPU, the transition between top-level and bottom-level hierarchy may be realized using the NVIDIA CUDA Higher Order Parallel Primitives for parallel sorting, stream compaction, and candidate-to-ray mapping using the scan operation.

The described GPU ray casting method may deliver a 10-15 times speedup over a contemporary 8-core CPU implementation.

Furthermore, the parallel queue processing mechanism allows hiding chunk preprocessing and loading latencies by keeping multiple ray queues in flight, employing for example CUDA streams for queuing memory transfer and computational work.

Thus, the dicing and acceleration structure build may result in a fixed cost for the set of rays associated with the bounding box. Hence, the amortization of this cost is higher the more rays are being tested with the primitive. By selecting queues depending on the number of rays in the queue, the scheduler can thus reduce this cost per total number of rays in the working set.

In another embodiment, the queue scheduler may take into account a priority associated with each ray, where such a priority may include the likelihood that the ray will not spawn further work and will thus free space in the ray working set, which then can be allocated for further rays. For example, shadow rays are guaranteed to terminate. As another example, extension rays of a higher generation with respect to the number of material interactions in the path tracer are likely to terminate before rays of a lower generation.

In another embodiment, the mechanism to regenerate new paths when a ray is terminated can be generalized to the queue management for the partition of chunks. Whenever a path terminates for example because of Russian Roulette or because the path no longer intersects geometry in the scene, the total set of active rays in the queue manager becomes smaller and can be filled by new paths corresponding to new samples in at least one of a selected quasi-Monte Carlo sample sequence or a (pseudo)-random sequence for the image to be computed, by calling the work item generator to create a queue for enough items to fill the capacity of the working set. Thus, it can be guaranteed that the size of the working set results in a high occupancy of work load for each chunk.

Figure 6:
FIG. 6 illustrates exemplary queue management for regenerating new paths, in accordance with another embodiment.

FIG. 6 illustrates exemplary queue management 600 for regenerating new paths, in accordance with one embodiment. As shown, an image of 3 pixels is rendered, with a ray set of 3, where the paths for visit the chunks ABACBA, AACB, A for each pixel respectively for the first sample index and ABACB, AC, AA for the second sample index. The paths ABACBA and AACB and A are processed in parallel, where the third path terminates early, in which case the work item generator injects ABACB from the next sample index to ensure an active ray set of 3. Similarly, as soon as AACB terminates, AC is injected. Thus the paths ABACBA, AACB, A, ABACB and AC can be processed with full occupancy. With the simple rule of always processing a chunk if it is resident or if the queue is empty select the chunk with the largest queue the chunks AABACBAC are visited. Visiting chunks by generation only would result in 15 visits.

Figure 7:
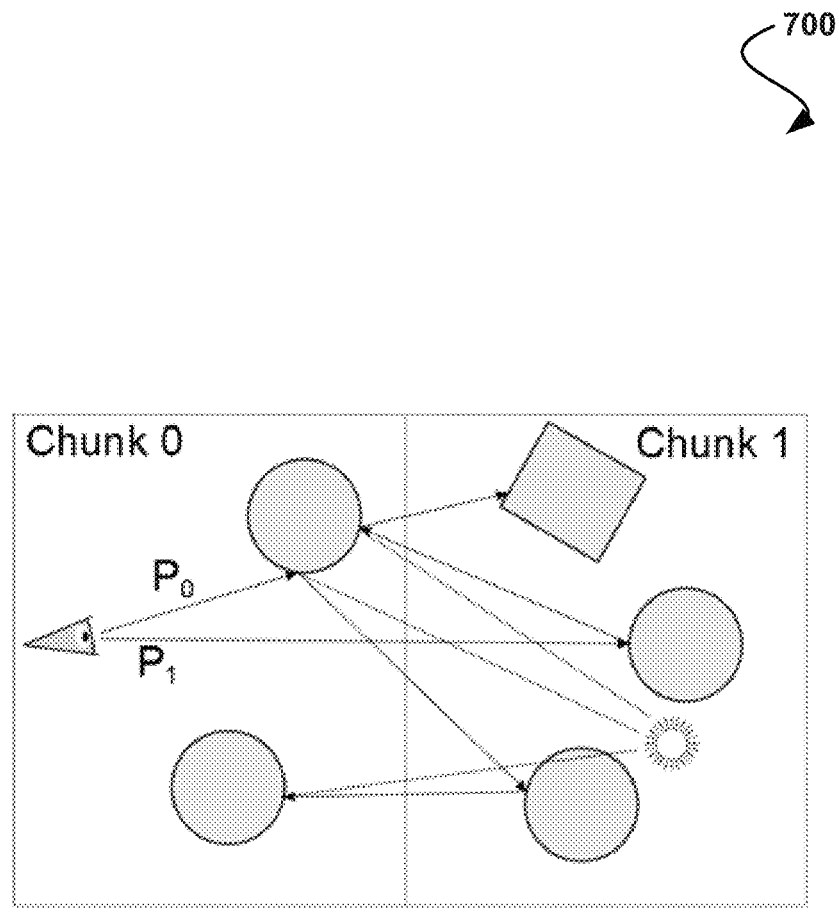
FIG. 7 illustrates how a set of candidate chunks that are overlapping with a shadow ray can be determined by executing a query to the top level acceleration structure over the bounding boxes of the chunk, in accordance with another embodiment.

In another embodiment of the queue manager, shadow rays can be tested order-independent with respect to the direction of the ray. Hence, they can be appended to the work queues of all chunks whose bounding box overlaps with the ray. After execution of the trace kernel of a given chunk, all shadow rays with a positive occlusion test can be removed from all queues of other chunks they overlapped with. FIG. 7 illustrates how the set of candidate chunks 700 that are overlapping with the shadow ray can be determined by executing a query to the top level acceleration structure over the bounding boxes of the chunk. Appending the shadow rays to all overlapping queues, allows the queue scheduler to improve the order in which chunks are processed. In particular, shadow rays can be scheduled for execution first in chunks which were likely to be processed and thus increase the benefit-cost ratio for selecting a chunk for processing.

For bidirectional path tracing simulations, the renderer maintains path vertex information for light and eye paths and state information necessary for evaluating weights according to multiple importance sampling of the subpath permutations. Here, the work item generation consists of extending the eye and light paths according to sampling the material reflectance distribution, creating shadow tests between the vertices or creating new bidirectional image samples upon termination of previous samples.

Figure 8:
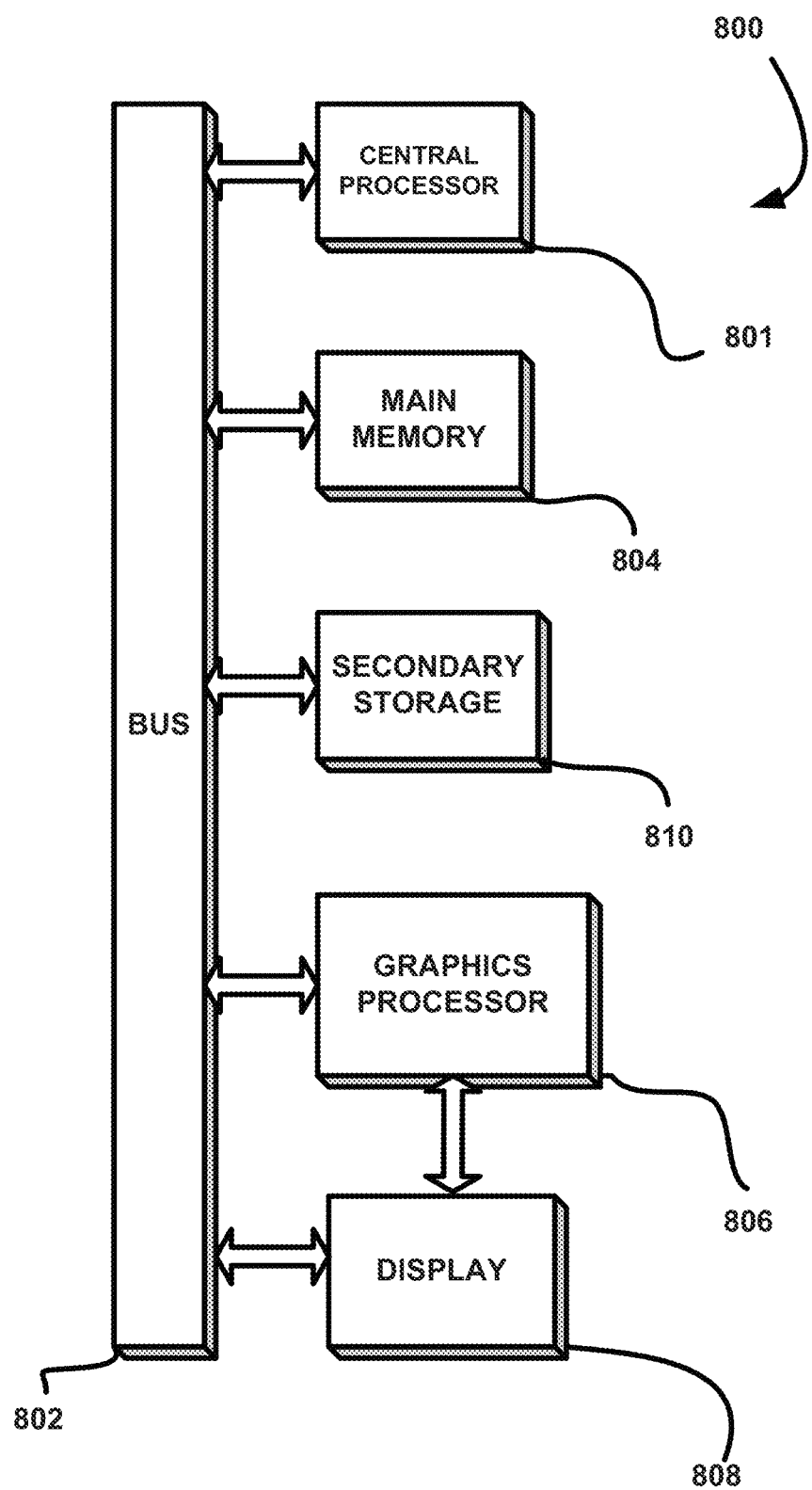
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, a system 800 is provided including at least one host processor 801 which is connected to a communication bus 802. The system 800 also includes a main memory 804. Control logic (software) and data are stored in the main memory 804 which may take the form of random access memory (RAM).

The system 800 also includes a graphics processor 806 and a display 808, i.e. a computer monitor. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. The system may also be realized by reconfigurable logic which may include (but is not restricted to) field programmable gate arrays (FPGAs).

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 804 and/or the secondary storage 810. Such computer programs, when executed, enable the system 800 to perform various functions. Memory 804, storage 810, volatile or non-volatile storage, and/or any other type of storage are possible examples of non-transitory computer-readable media.

In one embodiment, the architecture and/or functionality of the various previous figures may be implemented in the context of the host processor 801, graphics processor 806, an integrated circuit (not shown) that is capable of at least a portion of the capabilities of both the host processor 801 and the graphics processor 806, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, laptop computer, and/or any other type of logic. Still yet, the system 800 may take the form of various other devices including, but not limited to a personal digital assistant (PDA) device, a mobile phone device, a television, etc.

Further, while not shown, the system 800 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a processor, a set of light transport paths associated with a scene;
   performing, by the processor, parallel path tracing, utilizing a wavefront path tracer that uses a structure of arrays (SOA) memory layout, wherein performing the parallel path tracing further comprises regenerating one or more new light transport paths, utilizing one or more queues associated with one or more chunks.

2. The method of claim 1, wherein the scene includes a multimedia scene.

3. The method of claim 1, wherein each path is one of a plurality of paths that are stored within a pool accessible by the wavefront path tracer.

4. The method of claim 1, wherein the wavefront path tracer includes a path tracer that is decomposed into a plurality of stages.

5. The method of claim 4, wherein each of the stages of the wavefront path tracer include one or more kernels.

6. The method of claim 4, wherein a first stage of the wavefront path tracer includes a logic stage.

7. The method of claim 6, wherein the logic stage of the wavefront path tracer may include a single logic kernel.

8. The method of claim 7, wherein performing the path tracing on the path includes advancing the path by one segment, utilizing the logic kernel.

9. The method of claim 7, wherein performing the path tracing may include performing one or more additional operations, utilizing the logic kernel, where the one or more additional operations include:
   calculating multiple importance sampling weights for one or more light and extension segments;
   updating a throughput of an extended path;
   accumulating a light sample contribution in a path radiance if a shadow ray is not blocked;
   determining if a path should be terminated;
   accumulating a pixel value for a terminated path;
   producing a light sample for a path segment; and
   determining a material at an extension ray hit point.

10. The method of claim 4, wherein a second stage of the wavefront path tracer includes a material stage.

11. The method of claim 10, wherein the material stage includes a new path kernel as well as one or more material kernels.

12. The method of claim 11, wherein each of the kernels in the material stage include a queue.

13. The method of claim 12, wherein one or more of the queues receives requests from the logic stage for the kernel associated with the queue.

14. The method of claim 11, wherein each of the one or more material kernels is associated with a material.

15. The method of claim 10, wherein one or more ray cast requests are generated at the material stage.

16. The method of claim 4, wherein a third stage of the wavefront path tracer includes a ray cast stage.

17. The method of claim 16, wherein the ray cast stage includes an extension ray cast kernel and a shadow ray cast kernel.

18. The method of claim 1, wherein performing the parallel path tracing further comprises:
   precomputing Sobol sequences for the first 32 dimensions of each of the set of light transport paths;
   sharing the precomputed Sobol sequences between all pixels in the scene; and
   generating a quasirandom number on a GPU by performing a first lookup from the precomputed Sobol sequences and a second lookup from a scramble value buffer and XORing the results of the first lookup with the results of the second lookup.

19. The method of claim 18, wherein performing the parallel path tracing further comprises loading or generating chunk data, utilizing one or more chunk queues.

20. The method of claim 19, wherein the chunk data is represented in cache memory with low latency.

21. The method of claim 18, wherein performing the parallel path tracing further comprises allocating a memory block to store tessellation data and an acceleration hierarchy for all active processing elements.

22. The method of claim 19, wherein a queue scheduler is associated with the one or more chunk queues and accounts for a priority associated with each light transport path.

23. The method of claim 19, wherein a mechanism to regenerate new light transport paths when a light transport path is terminated is generalized to queue management for a partition of data chunks.

24. A method, comprising:
   identifying, by a processor, a set of light transport paths associated with a scene;
   performing, by the processor, parallel path tracing, utilizing a wavefront path tracer, wherein performing the parallel path tracing further comprises regenerating one or more new light transport paths, utilizing one or more queues associated with one or more chunks.

25. The method of claim 24, wherein performing the parallel path tracing further comprises, after an execution of a trace kernel of a given chunk, removing shadow rays with a positive occlusion test from all queues of other chunks having a bounding box overlapping with the shadow ray.

26. The method of claim 1, wherein performing the parallel path tracing further comprises:
   extending eye and light paths according to sampling a material reflectance distribution; and
   creating shadow tests between vertices; or
   creating new bidirectional image samples upon termination of previous samples.

27. A non-transitory computer-readable storage medium storing instructions that, when executed by a processor, cause the processor to perform steps comprising:
   identifying, by a processor, a set of light transport paths associated with a scene;
   performing, by the processor, parallel path tracing, utilizing a wavefront path tracer that uses a structure of arrays (SOA) memory layout, wherein performing the parallel path tracing further comprises regenerating one or more new light transport paths, utilizing one or more queues associated with one or more chunks.

28. A system, comprising:
a processor for:
identifying a light transport path associated with a scene,
performing parallel path tracing, utilizing a wavefront path tracer that uses a structure of arrays (SOA) memory layout, wherein performing the parallel path tracing further comprises regenerating one or more new light transport paths, utilizing one or more queues associated with one or more chunks.

* * * * *